(12) United States Patent
Dye et al.

(10) Patent No.: US 7,587,892 B2
(45) Date of Patent: Sep. 15, 2009

(54) APPARATUS, SYSTEM, AND METHOD FOR ADAPTING A FILTER REGENERATION PROFILE

(75) Inventors: Melissa H. Dye, Columbus, IN (US); Steven M. Bellinger, Columbus, IN (US); J. Steve Wills, Columbus, IN (US); Thomas A. Grana, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 88 days.

(21) Appl. No.: 11/301,998

(22) Filed: Dec. 13, 2005

(65) Prior Publication Data

US 2007/0130923 A1 Jun. 14, 2007

(51) Int. Cl.
*F01N 3/00* (2006.01)

(52) U.S. Cl. .............................. 60/295; 60/274; 60/276; 60/297; 60/311

(58) Field of Classification Search .................... 60/274, 60/276, 278, 280, 286, 295, 297, 311
See application file for complete search history.

(56) References Cited

U.S. PATENT DOCUMENTS

| | | | |
|---|---|---|---|
| 4,651,524 A | 3/1987 | Brighton | |
| 6,405,528 B1 | 6/2002 | Christen et al. | |
| 6,622,480 B2 | 9/2003 | Tashiro et al. | |
| 6,634,170 B2 | 10/2003 | Hiranuma et al. | |
| 6,666,020 B2 | 12/2003 | Tonetti et al. | |
| 6,735,941 B2 | 5/2004 | Saito et al. | |
| 6,756,904 B2 | 6/2004 | Kinugawa et al. | |
| 6,758,039 B2 | 7/2004 | Kuboshima et al. | |
| 6,805,095 B2 | 10/2004 | Sun et al. | |
| 6,820,418 B2 | 11/2004 | Nakatani et al. | |
| 6,829,889 B2 | 12/2004 | Saito et al. | |
| 6,829,890 B2 | 12/2004 | Gui et al. | |
| 6,851,258 B2 | 2/2005 | Kawashima et al. | |
| 6,854,265 B2 | 2/2005 | Saito et al. | |
| 6,862,927 B2 | 3/2005 | Craig et al. | |
| 6,865,885 B2 | 3/2005 | Kitahara | |
| 6,907,873 B2 | 6/2005 | Hamahata | |
| 6,928,809 B2 | 8/2005 | Inoue et al. | |
| 6,941,750 B2 | 9/2005 | Boretto et al. | |
| 6,951,100 B2 | 10/2005 | Kuboshima et al. | |
| 6,966,178 B2 | 11/2005 | Saito et al. | |
| 6,969,413 B2 * | 11/2005 | Yahata et al. | ............... 55/282.3 |
| 6,983,591 B2 | 1/2006 | Kondo et al. | |
| 7,000,384 B2 * | 2/2006 | Kagenishi | ..................... 60/295 |
| 7,054,734 B2 | 5/2006 | Todoroki et al. | |

(Continued)

FOREIGN PATENT DOCUMENTS

EP  1568865  *  8/2005

*Primary Examiner*—Thomas E Denion
*Assistant Examiner*—Diem Tran
(74) *Attorney, Agent, or Firm*—Kunzler & McKenzie

(57) ABSTRACT

An apparatus, system, and method are disclosed for adapting a regeneration profile for a particulate filter. A controller's input module receives inputs relating to conditions of the filter or engine, and a regeneration vector module creates a regeneration vector. The regeneration vector is based on the inputs and comprises a plurality of regeneration parameters. An output module directs a regeneration mechanism to regenerate the particulate filter according to the regeneration vector. The inputs may include filter condition and regeneration opportunity availability, and the parameters may include temperature, particulate load, exhaust composition and flow rate, and regeneration opportunity recognition.

36 Claims, 7 Drawing Sheets

U.S. PATENT DOCUMENTS

| | | |
|---|---|---|
| 7,069,721 B2 | 7/2006 | Gotou |
| 7,107,760 B2 | 9/2006 | Shirakawa |
| 7,111,455 B2 | 9/2006 | Okugawa et al. |
| 7,137,247 B2 | 11/2006 | Koga et al. |
| 7,147,693 B2 | 12/2006 | Inoue et al. |
| 7,162,867 B2 | 1/2007 | Saito et al. |
| 7,169,364 B2 | 1/2007 | Ohtake et al. |
| 7,208,029 B2 | 4/2007 | Shirakawa et al. |
| 7,231,291 B2 | 6/2007 | Dollmeyer et al. |
| 7,254,940 B2 | 8/2007 | Saitoh et al. |
| 7,264,642 B2 | 9/2007 | Hamahata et al. |
| 7,275,365 B2 | 10/2007 | Zhan et al. |
| 2002/0112472 A1 | 8/2002 | Tashiro et al. |
| 2002/0196153 A1 | 12/2002 | Kinugawa et al. |
| 2003/0167757 A1 | 9/2003 | Boretto et al. |
| 2003/0200742 A1 | 10/2003 | Smaling |
| 2003/0230079 A1 | 12/2003 | Kuboshima et al. |
| 2004/0103654 A1* | 6/2004 | Ohtake et al. .................. 60/295 |
| 2004/0159098 A1 | 8/2004 | Gui et al. |
| 2004/0159099 A1 | 8/2004 | Kuboshima et al. |
| 2004/0172933 A1 | 9/2004 | Saito et al. |
| 2004/0194453 A1 | 10/2004 | Koga et al. |
| 2004/0200271 A1 | 10/2004 | van Nieuwstadt |
| 2004/0204818 A1 | 10/2004 | Trudell et al. |
| 2005/0022519 A1 | 2/2005 | Shirakawa |
| 2005/0022520 A1 | 2/2005 | Shirakawa et al. |
| 2005/0044846 A1 | 3/2005 | Yahata et al. |
| 2006/0277898 A1 | 12/2006 | McCarthy, Jr. |

* cited by examiner

APPARATUS, SYSTEM, AND METHOD FOR ADAPTING A FILTER REGENERATION PROFILE

BACKGROUND OF THE INVENTION

1. Field of the Invention

This invention relates to engine exhaust purification systems, and more particularly to apparatuses, systems and methods for regenerating diesel engine particulate filters.

2. Description of the Related Art

Engine exhaust emission standards required by regulatory agencies typically monitor the release of diesel particulate matter, nitric oxides, and unburned hydrocarbons. A critical emission of gasoline or other stoichiometric engines is carbon monoxide. Catalytic converters have been implemented in exhaust gas after-treatment systems for spark-ignition engines, though historically such aftertreatment systems have often not been added to diesel engines. To remove particulate matter emanating from the latter, particularly in light of recently announced emissions standards, typically a diesel particulate filter is installed downstream from or in conjunction with a catalytic converter.

A common particulate filter comprises a porous ceramic matrix with parallel passageways through which exhaust gas passes. Particulate matter, usually ash and soot, accumulates on the surface of the filter, creating a buildup that must eventually be removed to prevent obstruction of the exhaust gas flow. Ash, a residue of burnt engine oil, is substantially incombustible and builds slowly within the filter. Soot, chiefly composed of carbon, refractory and not easily wiped away, can be oxidized and driven off of the filter in a regeneration process. In most applications soot accumulates much faster than ash, to the extent that an estimate of the rate of soot accumulation is substantially equivalent to an estimate of the rate of total particulate accumulation.

Various conditions, including but not limited to engine operating conditions, mileage, driving style, terrain, etc., affect the rate at which the engine produces particulate matter and the rate at which such matter accumulates within a diesel particulate filter. Notwithstanding this variability, existing systems typically regenerate the filter at set intervals of time or distance.

A controlled regeneration can be initiated by the engine's control system when a predetermined amount of particulate has accumulated on the filter, when a predetermined time of engine operation has passed, or when the vehicle has driven a predetermined number of miles. Oxidation from oxygen ($O_2$) generally occurs on the filter at temperatures above about 400 degrees centigrade, while oxidation from nitric oxides ($NO_2$), sometimes referred to herein as noxidation, generally occurs at temperatures between about 250 C and 400 C. Controlled regeneration typically consists of driving the filter temperature up to $O_2$ oxidation temperature levels for a predetermined time period such that oxidation of soot accumulated on the filter takes place.

A controlled regeneration can become uncontrolled if the oxidation process drives the temperature of the filter upwards more than is anticipated or desired, sometimes to the point beyond which the filter substrate material can absorb the heat, resulting in melting or other damage to the filter. Less damaging uncontrolled or spontaneous regeneration of the filter can also take place at noxidation temperatures, i.e., when the filter temperature falls between about 250 C and 400 C. Such uncontrolled regeneration generally does not result in runaway temperatures, but can result in only partial regeneration of the soot on the filter. Partial regeneration can also occur when a controlled regeneration cannot continue because of a drop in temperature, exhaust gas flow rate, or the like. Partial regeneration and other factors can result in non-uniformity of soot distribution across the filter, resulting in soot load estimation inaccuracies and other problems.

As noted above, typical controlled regenerations are lockstep affairs, occurring with limited input as to driving, engine, or filter conditions that might impact the regeneration profile, including when the regeneration should occur, when it should end, and how it should take place. Such practices can result in fuel inefficiencies and shortened filter life.

From the foregoing discussion, it should be apparent that a need exists for an apparatus, system, and method for adapting a filter regeneration profile based on relevant conditions.

SUMMARY OF THE INVENTION

The present invention has been developed in response to the present state of the art, and in particular, in response to the problems and needs in the art that have not yet been fully solved by currently available regeneration methods. Accordingly, the present invention has been developed to provide an apparatus, system, and method for adapting a filter regeneration profile that overcome many or all shortcomings in the art.

In one aspect of the invention, a method of adapting a regeneration profile of a particulate filter operatively connected to an engine includes receiving a plurality of inputs relating to conditions of the filter or engine; creating a regeneration vector based on the inputs, the regeneration vector comprising a plurality of regeneration parameters, and regenerating the particulate filter according to the regeneration vector. The method may be carried out in real time, and in one embodiment is carried out during an ongoing regeneration. The conditions may include the condition of particulate on the filter and availability of regeneration opportunities. The regeneration vector may be more aggressive as the filter condition improves and the availability of regeneration opportunities worsens. In one embodiment, the regeneration is carried out primarily by noxidation.

In one embodiment, the regeneration parameters include one or more of the following: a start-of-regeneration parameter, a type-of-regeneration parameter, and an end-of-regeneration parameter. The parameters may further include filter particulate load, regeneration opportunity recognition, exhaust gas flow rate and composition, temperature, warm-up temperature, temperature ramp rate, and persistence.

Another aspect of the invention comprises an internal combustion engine particulate filter regeneration apparatus that is capable of adapting its regeneration profile in real time. In one embodiment, the apparatus includes a regeneration mechanism; a plurality of sensors configured to determine conditions of the engine or filter; and a controller. The controller includes an input module configured to receive a plurality of inputs based on the conditions determined by the sensors; a regeneration vector module configured to create a regeneration vector comprising a plurality of regeneration parameters based on the inputs; and an output module configured to direct the regeneration mechanism to regenerate the filter according to the regeneration vector. The regeneration module may be configured to create a regeneration vector ranging from passive to gentle to normal to aggressive.

In another aspect of the invention, a diesel engine system according to the present invention includes a diesel engine; an engine intake mechanism operatively connected to the engine; an engine exhaust mechanism operatively connected to the diesel engine; an exhaust purification mechanism, having a particulate filter, that is operatively connected to the engine exhaust mechanism; a regeneration mechanism operatively connected to and configured to regenerate the particulate filter; a plurality of sensors configured to determine conditions of the engine or exhaust purification system; and a controller. The controller contains an input module configured to receive a plurality of inputs based on the conditions determined by the sensors; a regeneration vector module configured to create a regeneration vector comprising a plurality of regeneration parameters based on the inputs; and an output module configured to direct the regeneration mechanism to regenerate the filter according to the regeneration vector.

In one embodiment, the engine exhaust mechanism includes a turbocharger and an exhaust gas recirculation mechanism and the regeneration mechanism includes a reactant dosing system. The controller is configured to control the turbocharger, the exhaust gas recirculation mechanism, and the reactant dosing system to regenerate the filter according to the regeneration vector.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the drawings, in which.

DETAILED DESCRIPTION OF THE INVENTION

Figure 1:
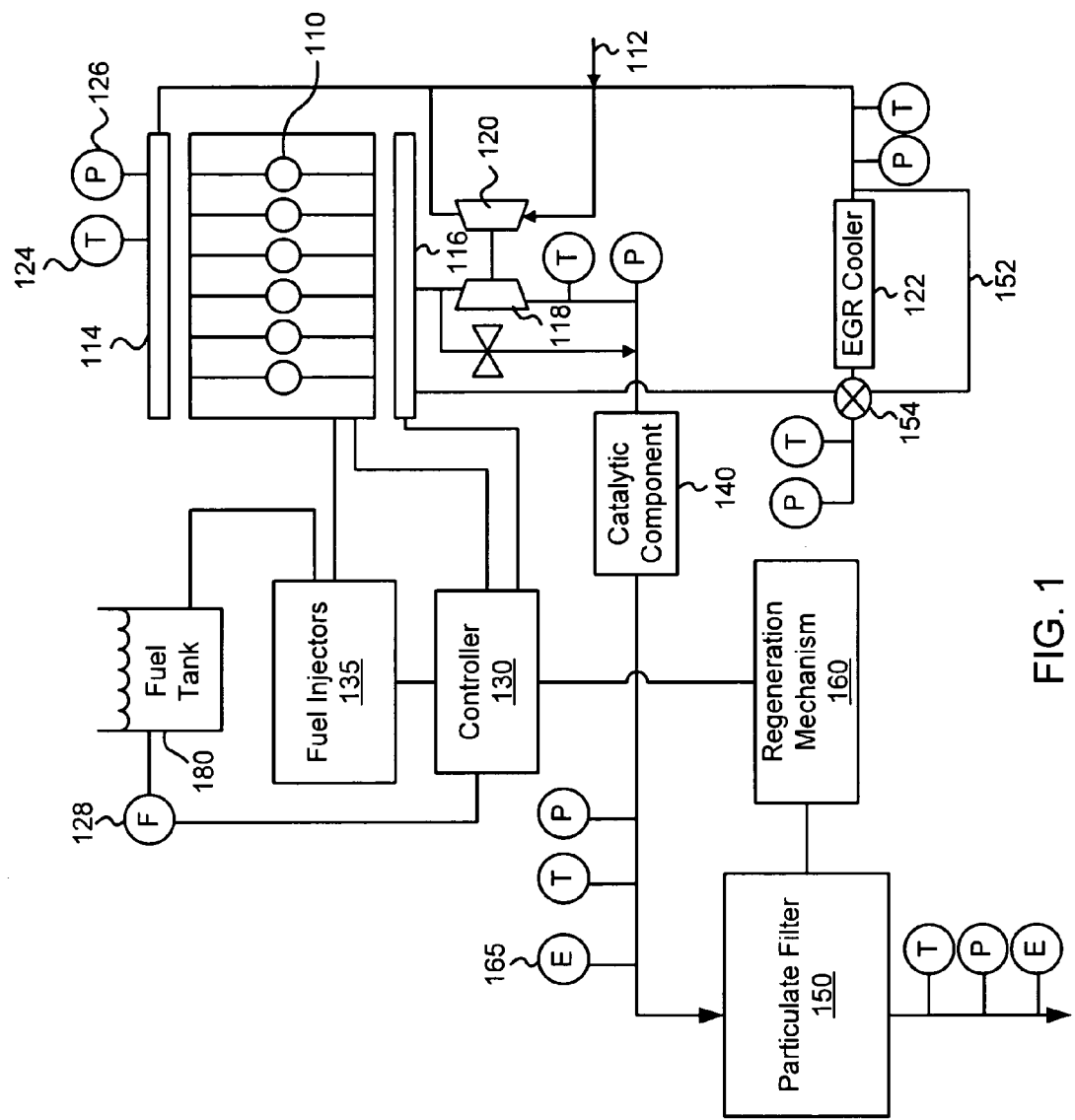
FIG. 1 is a schematic block diagram illustrating one embodiment of a diesel engine and exhaust system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an internal combustion engine system, such as a diesel engine system 100, in accordance with the present invention. As illustrated, the engine system 100 may include a diesel engine 110, a controller 130, fuel injectors 135, catalytic component 140, particulate filter 150, and fuel tank 180.

The engine system 100 may further include an air inlet 112, intake manifold 114, exhaust manifold 116, turbocharger turbine 118, turbocharger compressor 120, exhaust gas recirculation (EGR) cooler 122, temperature sensors 124, pressure sensors 126, and fuel sensors 128. In one embodiment, the air inlet 112 is vented to the atmosphere, enabling air to enter the engine system 100. The air inlet 112 may be connected to an inlet of the intake manifold 114. The intake manifold 114 includes an outlet operatively coupled to the combustion chambers of the engine 110. Within the engine 110, compressed air from the atmosphere is combined with fuel to power the engine 110, which comprises operation of the engine 110. The fuel comes from the fuel tank 180 through a fuel delivery system including, in one embodiment, a fuel pump and common rail (not shown) to the fuel injectors 135, which injects fuel into the combustion chambers of the engine 110. Fuel injection timing is controlled by the controller 130. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the particulate filter 150 for filtering of particulate matter before venting to the atmosphere. The exhaust gas may pass through one or more catalytic components 140 to further reduce the number of pollutants. A regeneration mechanism 160 regenerates the filter 150, with the controller 130 establishing a regeneration vector and directing the regeneration mechanism 160 to regenerate the filter 150 in a regeneration profile in accordance with the regeneration vector, as further detailed below.

Particulate matter produced by the engine 110 comprises ash and soot. Soot accumulates much faster than ash, such that, in many cases, particularly when the filter has been in operation for a relatively short period, an estimate of the rate of total particulate accumulation can be satisfactorily generated by estimating the rate of soot accumulation, treating the ash accumulation rate as negligible.

Some amount of the exhaust gas may be re-circulated to the engine 110, according to a proportion set by the controller 130. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Various sensors, such as temperature sensors 124, pressure sensors 126, fuel sensor 128, exhaust gas flow sensors 165, and the like, may be strategically disposed throughout the engine system 100 and may be in communication with the controller 130 to monitor operating conditions. In one embodiment, the fuel sensor 128 senses the amount of fuel consumed by the engine, and the exhaust gas flow sensors 165 sense the rate at which exhaust gas is flowing at the particulate filter 150.

Engine operating conditions can be ascertained from any of the sensors or from the controller 130's commands to the engine regarding the fraction of exhaust gas recirculation, injection timing, and the like. In one embodiment, information is gathered regarding, for example, fueling rate, engine speed, engine load, the timing at which fuel injection timing is advanced or retarded (SOI, or start of injection), time passed, fraction of exhaust gas recirculation, driving conditions, whether and when regenerations have occurred and the rate such regenerations have removed particulate matter, exhaust flow rate, the amount of $O_2$ and $NO_2$ in the exhaust, filter temperature, exhaust gas pressure, filter particulate load amount and uniformity, etc.

The engine 110 will produce soot and ash at a rate that will vary according to the type of engine it is; for example, whether it is an 11-liter or 15-liter diesel engine. Additionally, the rate of particulate production will vary according to engine operating conditions such as fuel rate, EGR fraction, and SOI timing. Other factors may also bear on the particulate production rate, some depending heavily on the engine platform being considered, with others closer to being platform-independent.

Figure 2:
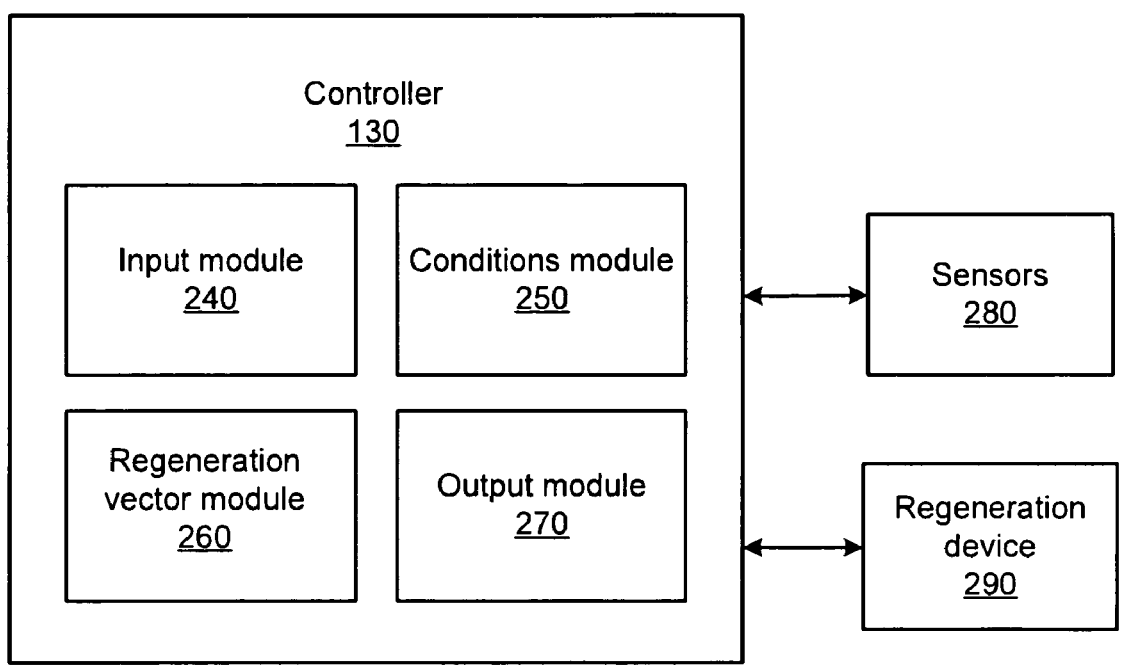
FIG. 2 is a schematic block diagram illustrating one embodiment of a control system according to the present invention.

FIG. 2 depicts a control system 200 according to the present invention. The control system 200 comprises the controller 130, sensors 280, and a regeneration device 290. The sensors 280 may include the sensors 124, 126, and 165 of FIG. 1. The regeneration device 290 may correspond to the regeneration mechanism 160.

The controller 130 comprises an input module 240, a conditions module 250, a regeneration vector module 260, and an output module 270.

As is known in the art, the controller 130 and components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

The sensors 280 are configured to determine a plurality of conditions within the engine system 100, including temperature, pressure, exhaust gas flow rate, etc. The regeneration device 290 is configured to regenerate the filter 150 at the direction of the controller 150. The input module 240 is configured to input the conditions sensed by the sensors 280 and provide corresponding inputs to the regeneration vector module 260, which creates a regeneration vector according to the inputs. The conditions module 250 is configured to gather information regarding current conditions of the engine system 100, based on the conditions sensed by the sensors 280 and/or other inputs including commands issued to system components by the controller 130. The output module 270 is configured to direct the regeneration device 290 to regenerate the filter 150 according to the regeneration vector created by the regeneration vector module 260 and the current conditions determined by the conditions module 250.

Figure 3:
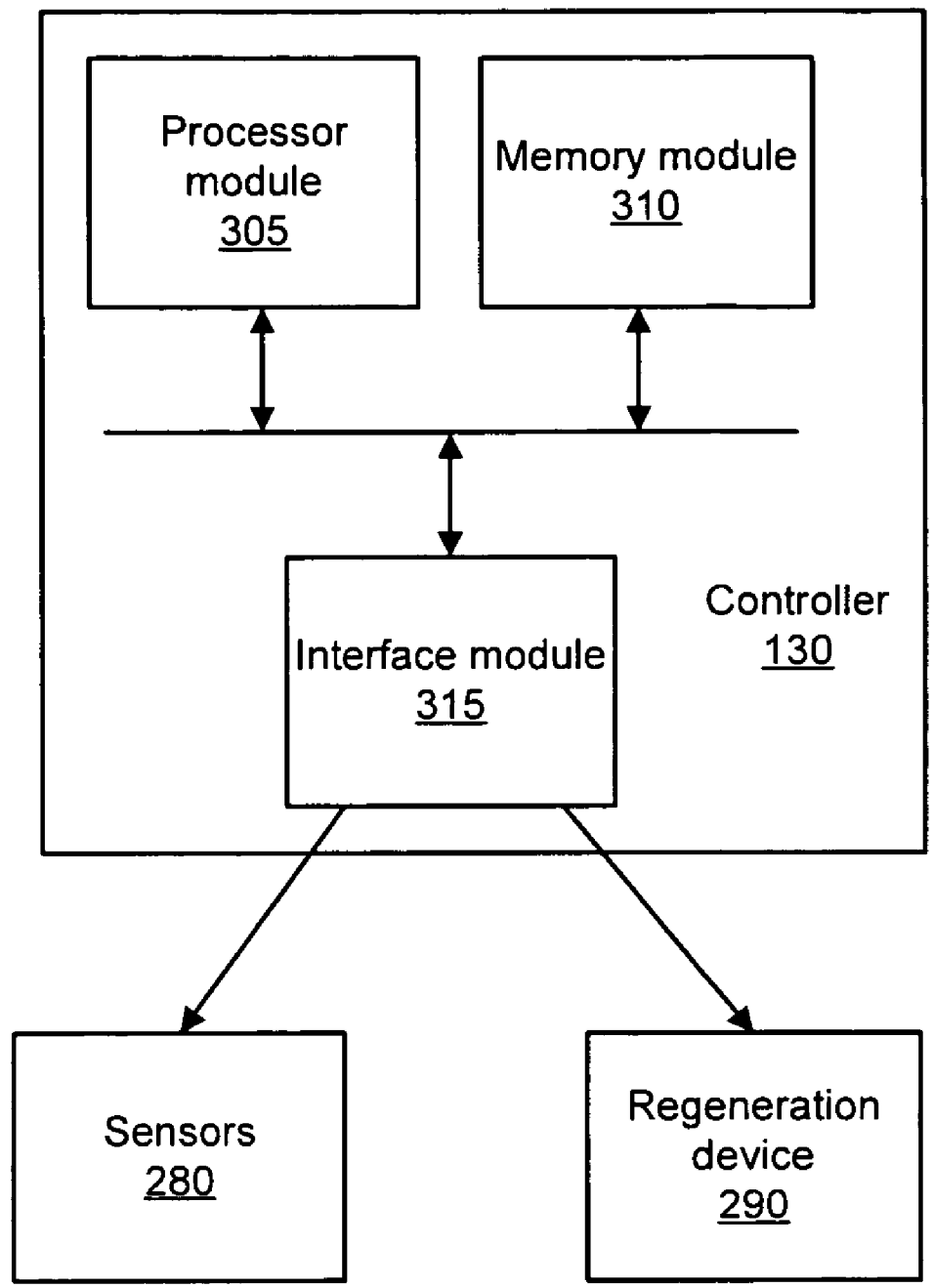
FIG. 3 is a schematic block diagram illustrating another embodiment of a control system according to the present invention.

FIG. 3 is a schematic block diagram illustrating another embodiment of the control system 200 of FIG. 2. The controller 130 is depicted as comprising a processor module 305, memory module 310, and interface module 315. The processor module 305, memory module 310, and interface module 315 may be fabricated of semiconductor gates on one or more semiconductor substrates. Each semiconductor substrate may be packaged in one or more semiconductor devices mounted on circuit cards. Connections between the processor module 305, the memory module 310, and the interface module 315 may be through semiconductor metal layers, substrate to substrate wiring, or circuit card traces or wires connecting the semiconductor devices.

The memory module 310 stores software instructions and data comprising one or more software processes. The processor module 305 executes the software processes as is known to those skilled in the art. In one embodiment, the processor module 305 executes one or more software processes carried out by the conditions module 250 and regeneration vector module 260 of FIG. 2.

The processor module 305 may communicate with external devices and sensors such as the sensors 280 and the regeneration device 290 of FIG. 2 through the interface module 315. For example, the sensors 280 may comprise a pressure sensor 126 (FIG. 1), with the sensors 280 communicating an analog signal representing a pressure value to the interface module 315. The interface module 315 may periodically convert the analog signal to a digital value and communicate the digital value to the processor module 305.

The interface module 315 may also receive one or more digital signals through a dedicated digital interface, a serial digital bus communicating a plurality of digital values, or the like. For example, the sensors 280 may comprise the air-flow sensor 156 of FIG. 1 and communicate a digital air flow value to the interface module 315. The interface module 315 may periodically communicate the digital air flow value to the processor module 305. In one embodiment, the interface module 315 executes one or more communication processes carried out by the input module 240 and output module 270 of FIG. 2.

The processor module 305 may store digital values such as the pressure value and the air flow value in the memory module 310. In addition, the processor module 305 may employ the digital values in one or more calculations including calculations carried out by the conditions module 250 and regeneration vector module 260. The processor module 305 may also control one or more devices such as the regeneration device 290 through the interface module 315.

Figure 4:
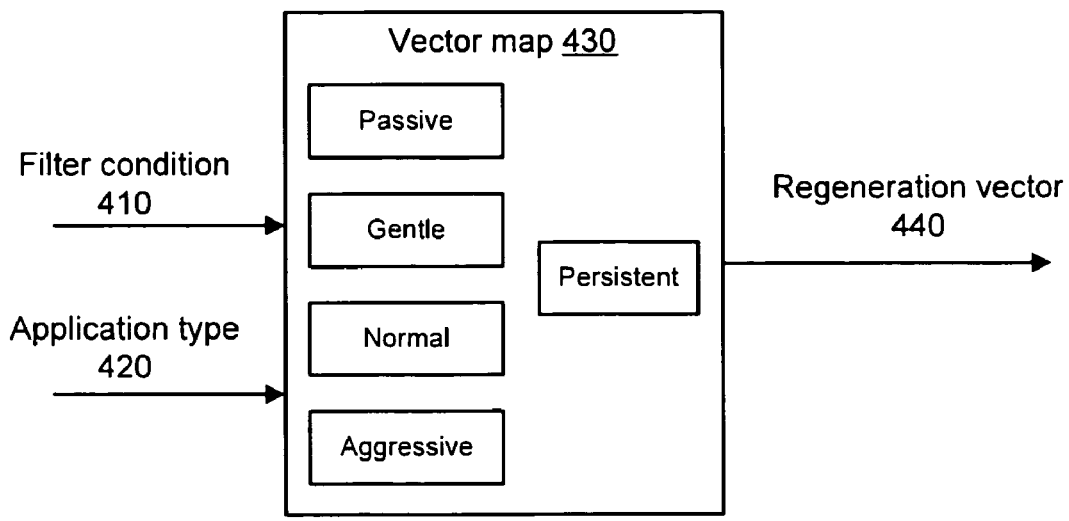
FIG. 4 is a chart illustrating one embodiment of a method of determining a regeneration vector according to the present invention.
Figure 5:
FIG. 5 illustrates one embodiment of a filter condition index map according to the present invention.

Referring now to FIGS. 4 and 5, the regeneration vector module 260 creates a regeneration vector 440 according to inputs such as a filter condition 410 and an application type 420. Referring particularly to FIG. 5, the filter condition 410 may comprise a filter condition index 500, which is a function of soot load 510 and soot uniformity 520 on the filter 150. In one embodiment, the filter condition index 500 ranges from one to ten, with one denoting the best filter condition and ten denoting the worst. In the illustrated embodiment, the soot load 510 level is indicated generally by 0 percent (no significant soot load on the filter), 30 percent (the filter being about one-third fully loaded), 60 percent (about two-thirds fully loaded), and 90 percent (at or nearing fully loaded). Other things being equal, the more soot or total particulate load on the filter, the higher the filter condition index 500 and the worse the filter condition 410. Other ways and gradations of indicating the soot load 510 will be apparent to those skilled in the art in light of this disclosure.

The soot load 510 may be measured or estimated by any method or combination of methods available, including differential pressure across the filter, duration of engine operation, time passed, engine particulate production rate, oxidation rate, etc. One embodiment of estimating soot load is disclosed in a related patent application Ser. No. 11/227,320, "Apparatus, System, and Method for Providing Combined Sensor and Estimated Feedback." An embodiment of estimating engine particulate production rate is disclosed in a related patent application Ser. No. 11/227,857, "Apparatus, System, and Method for Estimating Particulate Production." An embodiment of estimating oxidation rate is disclosed in a related patent application Ser. No. 11/227,403, "Apparatus, System, and Method for Estimating Particulate Consumption." All three applications are incorporated herein by reference.

The soot uniformity 520 level is indicated generally by "uniform" (the soot is or nearly is distributed uniformly across the filter), "maldistributed" (soot distribution is uneven across the filter) and "very maldistributed" (soot distribution is highly uneven across the filter). Soot uniformity 520 may be measured or estimated by any method available, including a method disclosed in a related patent application Ser. No. 11/226,972, "Apparatus, System, and Method for Determining the Distribution of Particulate Matter on a Particulate Filter," incorporated herein by reference.

Other embodiments may consider only one of the factors 510 and 520 in determining the filter condition 410, and/or additional factors, as will be apparent to those skilled in the art in light of this disclosure.

FIG. 4 schematically illustrates a logic chart in which a regeneration vector 440 is chosen. In one embodiment, the logic is carried out by the regeneration vector module 260. The filter condition 410 and an application type 420 input to a vector map 430, which outputs a regeneration vector 440.

The application type 420 refers to the type and style of driving undergone by the engine 110 and the vehicle in which it is housed. Regeneration opportunities vary from application to application. For example, an engine housed in a long-haul semi truck will have relatively more opportunities to regenerate, since the truck often travels at high speeds for long periods of time, translating to high, sustained exhaust air flow, a desirable factor for regeneration. On the other hand, a short-haul delivery truck driven around a city with frequent starts and stops will have relatively few opportunities to regenerate. One embodiment of vehicle application classifications for purposes of regeneration is disclosed in a related application Ser. No. 11/301,808, "Apparatus, System, and Method for Determining a Regeneration Availability Profile," incorporated herein by reference. That application also discloses a method of recognizing regeneration opportunities.

According to the present invention, generally the worse the filter condition 410, the less aggressive the regeneration in order to prevent runaway temperatures and uncontrolled regeneration that may damage the filter 150 and cause problems to surrounding structures. Conversely, generally the worse the application type 420 (i.e., an application presenting fewer regeneration opportunities, such as a short-haul delivery truck), the more aggressive the regeneration when an opportunity does present itself, since such opportunities come relatively infrequently and may not last long.

The embodiment of the present invention shown in FIG. 4 considers both filter condition 410 and application type 420 to determine a regeneration vector. Some alternative regeneration vectors shown in the vector map 430 are "passive," "gentle," "normal," and "aggressive." Each of these alternative regeneration vectors may be made persistent, meaning that after a regeneration ends prematurely, such as by a drop in temperature, the controller 130 will attempt to reinitiate regeneration for a longer period of time than it might otherwise.

For example, the controller 130 may initiate a regeneration of the filter 150 when the filter is loaded with 120 grams of particulate, with a goal of reducing the load to 60 grams. If the temperature drops out of or exceeds the regeneration temperature range when the soot load reaches 90 grams, a normal situation may call for the controller 130 to not reattempt regeneration after 30 seconds or so of insufficient temperature, given that the soot load has reached a satisfactory level. In a bad application type 420, however, where there are fewer chances to regenerate, the controller 130 may choose a regeneration vector with a high persistence parameter, continuing to keep the regeneration active for 30 minutes or more, waiting for the temperature to return to regeneration levels. If the temperature is below the desired range, the controller 130 may also call for reactant dosing on the filter 150 or other practices designed to forcibly drive the temperature up and reinitiate regeneration.

Filter temperature may drop below the regeneration range due to light driving load, decrease in available oxidation fuel (i.e., soot on the filter), and/or other factors. The regeneration vector 440 may also call for a premature regeneration ending due to high temperatures that threaten the integrity of the filter. These can be caused by a decrease in exhaust flow rate, such as when the vehicle in which the engine system 100 is housed stops at a stop light or stop sign during an ongoing regeneration, resulting in a sharp decrease in exhaust flow rate and a filter temperature spike.

When the filter condition 410 is very bad, with a very high soot load 510 and uniformity 520 highly maldistributed, a passive regeneration vector may be chosen, herein taken to mean a regeneration undergone primarily by oxidation from nitric oxide, or noxidation. As noted above, noxidation occurs in approximately the 250 C-400 C temperature range, and generally takes much longer than oxidation from $O_2$; however, it is also much less likely to result in runaway temperatures. Once the filter condition 410 improves and the danger of runaway temperatures decreases, the regeneration vector 440 may be changed to a more aggressive choice. Noxidation is generally not preferred (or even allowed by regulation) because of environmental concerns, but may be an option to alleviate a dangerously bad filter condition.

As the filter condition 410 improves and the application type 420 worsens, in one embodiment the regeneration vector 440 chosen from the vector map 430 increases from gentle to normal to aggressive. This may be done in real time, i.e., during operation of the engine system 100 in the field, and even during an on-going regeneration, changing the regeneration profile as inputs dictate. Any of the more aggressive or less aggressive regeneration vectors may be given a high persistence parameter. In each case, factors aiming at accomplishing the regeneration more quickly or less quickly may be brought to bear, such as increasing the temperature on the filter 150, increasing the amount of $O_2$ in the exhaust gas stream, ramping more quickly to the target regeneration temperature, etc. The type of regeneration vector 440 chosen is a design choice based on the inputs, and consists of a collection of parameters (further detailed below) corresponding to the factors impacting the regeneration profile.

Depending on conditions, a regeneration may be more aggressive with regard to some parameters and less aggressive with regard to others. For example, if the filter condition 410 is extremely poor and the application type 420 is also poor, when a regeneration opportunity presents itself the regeneration vector 440 may comprise a rapid temperature ramp rate, to take advantage of the relatively rare regeneration opportunity, but also comprise (at least initially) a low regeneration target temperature, to avoid runaway temperatures and uncontrolled regeneration. The target temperature may be increased as the filter condition improves and the risk of uncontrolled regeneration correspondingly decreases.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
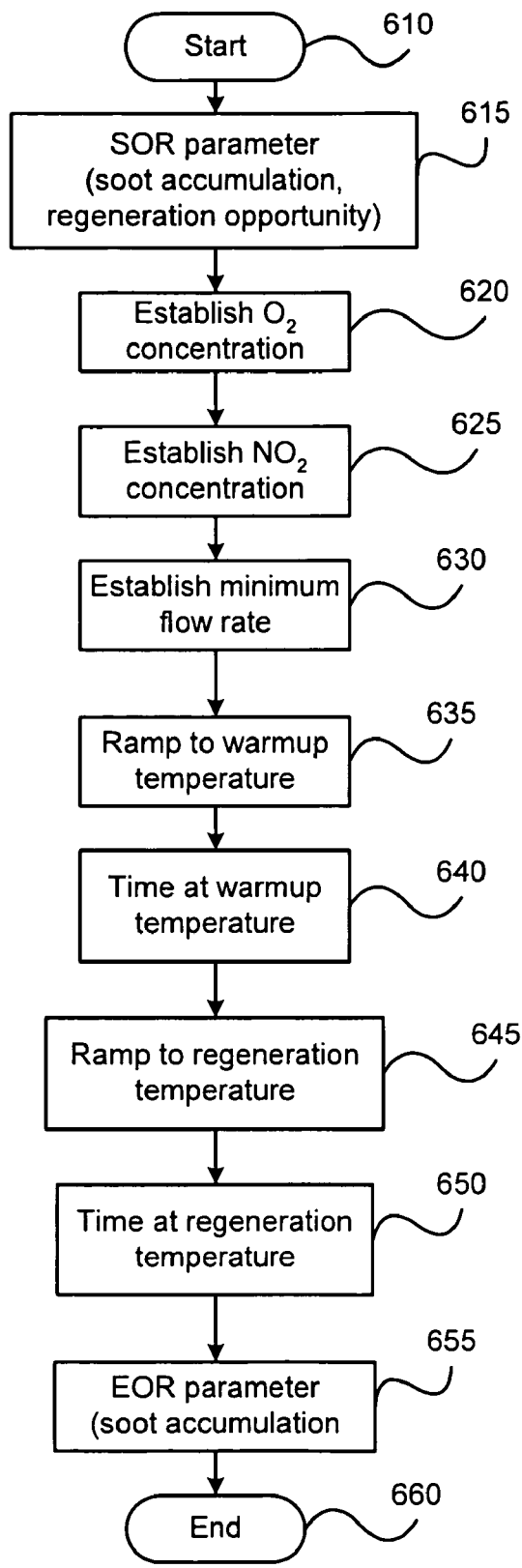
FIG. 6 is a schematic flow chart diagram illustrating an embodiment of a filter regeneration method according to the present invention.

FIG. 6 illustrates a regeneration profile method 600 of a regeneration of the filter 150, noting several parameters that make up the regeneration vector 440. The method may be carried out by the regeneration device 290 and controller 130 in one embodiment.

A typical 22-liter particulate filter will range between 60 grams of particulate on the low end and 120 grams of particulate on the high end as a desirable filter load range, based on engine backpressure caused by the particulate's blockage of exhaust gases, though the filter may physically be able to take on well more than 200 grams. An EOR (end-of-regeneration) particulate load parameter may be in the range of 40 grams. One embodiment of a regeneration vector 440 might have an SOR (start-of-regeneration) particulate load parameter level of 120 grams, with an EOR value of 40. Limitations in the controls cause difficulty in measuring very low soot load levels, such as 20 grams, due to signal-to-noise ratios. Thus, in one embodiment, a filter deep clean regeneration vector 440 might include an EOR soot load parameter value of 40 grams, with a subsequent predetermined regeneration time intended to burn off the rest, since at that point the soot level may not be capable of accurate measurement.

The method begins in block 610, and in block 615 the conditions module 250 indicates that, based on current conditions, an SOR parameter is satisfied 615, beginning the regeneration. The SOR parameter is one of the parameters making up the regeneration vector, and may itself comprise parameters such as soot loading on the filter 150, recognition of a regeneration opportunity (particularly for bad application types 420), a combination of the two, and/or other parameters indicating the point at which a regeneration is desirable. A typical SOR soot parameter level might be 120 grams, as explained above. With regard to regeneration opportunity, if the application type 420 is bad (such as a local delivery truck) and the conditions module 250 recognizes a regeneration opportunity of only 45 seconds, the SOR parameter of the regeneration vector 440 might be satisfied even if the filter soot level is not unduly high, with the output module 270 initiating a regeneration primarily because another opportunity might be long in coming.

In the next block 620, the concentration of $O_2$ in the exhaust gas, another regeneration vector parameter, is determined by the conditions module 250, and, if oxygen is not at the level indicated by the regeneration vector 440, the output module 270 in one embodiment instructs the regeneration device 290 to attempt to bring $O_2$ concentration into compliance by changing SOI timing, injection spray angle, varying EGR fraction, and/or other factors available for common-rail systems that will be apparent to those skilled in the art in light of this disclosure.

In the next block 625, the concentration of $NO_2$ in the exhaust gas, another regeneration vector parameter, is determined by the conditions module 250, and, if it is not at the level indicated by the regeneration vector 440 (diesel engines such as the engine 110 will typically produce nine parts NO to one part $NO_2$), the controller 130 in one embodiment attempts to bring $NO_2$ concentration into compliance.

In the next block 630, the conditions module 250 determines whether the exhaust gas is flowing at the minimum rate indicated by the corresponding parameter value in the regeneration vector 440. A certain level of exhaust flow is necessary to carry away the heat generated by filter regeneration. If the flow is not at the parameter level indicated, the controller 130 in one embodiment attempts to bring it into compliance by, for example, increasing the amount of fuel injected into the engine 110, increasing engine speed, closing the EGR valve 154, adjusting the variable-geometry turbo 118 to make it more aggressive, and other factors apparent to those skilled in the art in light of this disclosure.

Filter temperature depends on the application type. For an 80,000-pound truck traveling at 55 miles per hour, for example, the temperature might be at 200 C-250 C. That could reach 500 C-550 C if the truck is climbing a hill fully loaded. For a smaller delivery truck making frequent stops, the filter temperature would more typically be around 150 C, with occasional temperature spikes reaching as high as 500 C.

In the next block 635, the conditions module 250 determines the current temperature of the filter 150. The output module 270 instructs the regeneration device 290 to ramp up from the current filter temperature to a warm-up temperature, if needed, at a rate and to a level indicated by the corresponding parameter values in the regeneration vector 440 by dosing the filter 150 with reactant or otherwise, as is known in the art.

Regeneration warm-ups are used to minimize damage and wear on the filter 150. The filter 150 expands as it heats up. If it is made of differing materials, or if housings or surrounding materials are different from the filter substrate, uneven heating and expansion can occur with rapid rises in temperatures, resulting in damage. The filter 150 may also experience different temperatures within itself, especially along its length, even if it is all of a piece.

A typical warm-up temperature might be 400 C, with a ramp rate of 10 C to 50 C per second. The regeneration vector 440 may increase the warm-up temperature and ramp rate for bad applications, in which there may not be as much time for a regeneration, or for other reasons based on the inputs.

In block 640 the filter 150 remains at the warmup temperature for a time indicated by the corresponding parameter value of the regeneration vector 440, which may be 30 seconds to 2 minutes depending on the filter substrate and the regeneration vector 440 inputs. In block 645 the output module 270 instructs the regeneration device 290 to ramp up the filter temperature to a target regeneration temperature at a rate and to a level indicated by the corresponding parameter values in the regeneration vector 440. That rate may be 1 C to 2 C per second, depending on the filter condition 410, application type 420, or other input factors. Typical target temperatures might range from 475 C to 575 C, depending on the inputs.

If the regeneration vector 440 contains a target temperature parameter corresponding to a passive regeneration (FIG. 4), the target temperature parameter would be more in a noxidation temperature range of 250 C-400 C.

In block 650 the filter 150 remains at the regeneration temperature for a time indicated by the corresponding parameter value in the regeneration vector 440 or until one or more end-of-regeneration (EOR) triggers are satisfied (block 655), such as the level of soot on the filter decreasing to a level indicated by the corresponding regeneration vector parameter value. The method then ends as indicated in block 660.

From FIG. 6 it can be seen that in one embodiment the regeneration vector 440 is made up of one or more parameter values that may include filter soot load (at the beginning and end of the regeneration), potential regeneration opportunity, exhaust oxygen concentration, exhaust nitric oxide concentration, exhaust minimum flow rate, warm-up temperature ramp rate, warm-up temperature level, time at warm-up temperature, target temperature ramp rate, target temperature level, and time at target temperature. In one embodiment, the regeneration vector 440, through its component parameters, indicates when a regeneration should begin, how it should be carried out, and when it should end. The parameter values indicate whether the regeneration vector is passive, gentle, normal, aggressive, persistent, or some other category between or different from those mentioned.

Another parameter included in the regeneration vector 440 in one embodiment is a maximum oxidation rate, i.e., the maximum oxidation rate the regeneration vector 440 will allow based on soot level, temperature, $O_2$ concentration, and/or other factors. A maximum temperature parameter can also be included, which the regeneration vector 440 uses to prematurely end the regeneration should the current filter temperature exceed the maximum temperature parameter. About 600 C is a dangerously high temperature level, and typical filter substrates will melt at 700 C-800 C.

Figure 7:
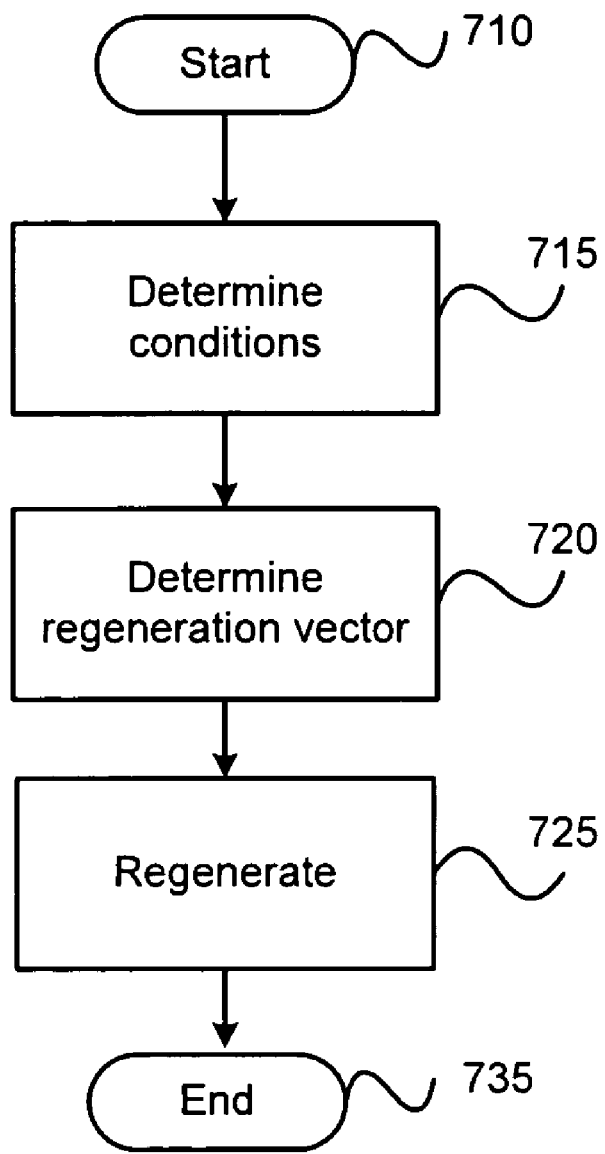
FIG. 7 is a schematic flow chart diagram illustrating an embodiment of a method of determining a regeneration vector and regenerating a filter according to the regeneration vector.

The method 700 illustrated in FIG. 7 shows a simple embodiment of the present invention. The method begins in block 710, and in block 715 the sensors 280 determine conditions of engine 110, filter 150, or other conditions upon which the regeneration vector 440 is chosen. These may include, as indicated in the embodiment illustrated by FIGS. 4 and 5, filter condition 410 and application type 420, but may include others as determined by the design choice of the user. In block 720 the input module 240 inputs the conditions determined by the sensors 280, and the regeneration vector module 260 determines the regeneration vector 440, in one embodiment by choosing the regeneration vector from the vector map 430, as a collection of chosen parameters.

In block 725 the regeneration device 290 regenerates the filter 150 under instructions from the output module 270, which initiates regeneration when the conditions module 250 indicates that the SOR parameters of the regeneration vector 440 have been satisfied by current conditions. The regeneration is carried out in accordance with the regeneration vector 440, and ends when the EOR parameters of the regeneration vector 440 have been satisfied by current conditions. The method then ends in block 735.

Figure 8:
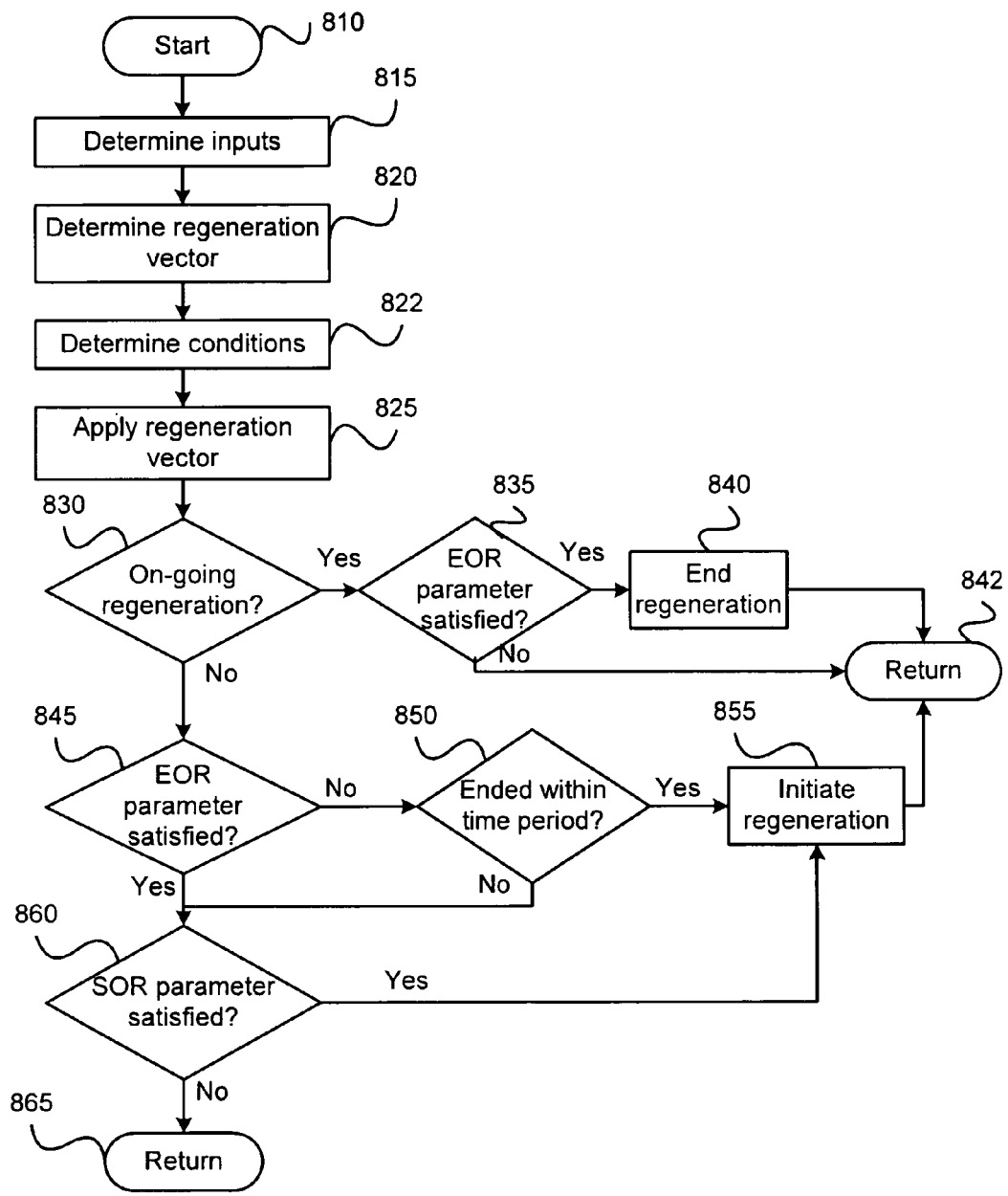
FIG. 8 is a schematic flow chart diagram illustrating another embodiment of a method of determining a regeneration vector and regenerating a filter according to the regeneration vector.

FIG. 8 illustrates an embodiment of a method 800 according to the present invention that illustrates its use in real time, including during an on-going regeneration, as well as the use of the persistence parameter discussed in connection with FIGS. 4 and 5. As shown, the method begins in block 810, and in block 815 the sensors 280 and input module 240 determine inputs relating to conditions determined by the user to be relevant to the regeneration profile. In block 820, the regeneration vector module 260 determines the regeneration vector 440 as described above, the regeneration vector 440 comprising a group of parameters indicating the regeneration profile. In block 822, the conditions module 250 determines current conditions of the engine system 100, and (block 825) the regeneration vector is applied to the conditions. In block 830 the controller 130 then determines if an on-going regeneration is in progress. If so, in block 835 the controller 130 determines whether the EOR parameter value of the regeneration vector 440 is satisfied. In one embodiment, the EOR parameter comprises a particular soot load level on the filter 150. If the EOR parameter is satisfied, in block 840 the output module 270 instructs the regeneration device 290 to end the regeneration, and the method returns in block 842 to the start block 810.

A determination that the EOR parameter is not satisfied in block 835 indicates that the regeneration is not yet complete, and the method returns in block 842 to the beginning 810. The method 800 undergoes another iteration, with another regeneration vector being chosen (block 820) based on current conditions, which may have changed since the last iteration; such as, by example, the amount of soot oxidized on the filter 150 since the previous iteration. In this example, with less soot on the filter the regeneration vector 440 may be more aggressive, increasing the temperature parameter or modifying other parameters accordingly to keep the regeneration at an efficient rate, optimizing fuel economy and filter life.

If in block 830 the controller 130 determines that there is no on-going regeneration, it determines in block 845 if the EOR parameter value of the regeneration vector 440 is satisfied by current conditions. This step determines whether the regeneration has ended prematurely. If the EOR parameter is not satisfied, in block 850 the controller 130 determines if the regeneration ended within a time period indicated by the corresponding persistence parameter of the regeneration vector 440. That time period may range from 30 seconds to 30 minutes or more, depending on the persistence parameter level indicated. If the regeneration ended within the time period, indicating a probable premature end to the regeneration, in block 855 the output module 270 attempts to reinitiate regeneration by recognizing a raised temperature (such as when the engine is placed under a heavier load by the truck going up a hill or the like), raising the temperature through dosing, increasing $O_2$ concentration, recognizing or creating increased exhaust gas flow, or other ways. The method then returns in block 842 to the beginning 810.

If in block 850 the controller 130 determines that the regeneration did not end within the time period indicated by the regeneration vector 440, the method goes to block 860, wherein the controller 130 determines whether the SOR parameter value is satisfied. Block 860 may also be reached from block 845 if the controller 130 determines that the EOR parameter is satisfied. In either case, the logic is that the regeneration has ended satisfactorily or that enough time has passed to abandon attempts to revive a prematurely ended regeneration.

With the controller 130 having determined that there is no ongoing regeneration, in block 860 the controller 130 determines whether one should be initiated, by examining the SOR parameter. If that parameter is not satisfied, the method returns in block 865 to the beginning 810. Conversely, if the controller 130 determines that the SOR parameter is satisfied, the output module 270 attempts to initiate regeneration in block 855, and the method returns in block 842 to the beginning.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of adapting a regeneration profile of a particulate filter operatively connected to an engine of a vehicle, the method comprising:
   receiving a plurality of inputs relating to at least one of a filter condition and vehicle application type;
   creating a regeneration vector based on the inputs, the regeneration vector comprising a plurality of regeneration parameters, wherein at least one of the plurality of regeneration parameters comprises one of a plurality of possible regeneration rates each corresponding to a filter condition and vehicle application type combination; and
   regenerating the particulate filter according to the regeneration vector.

2. The method of claim 1, wherein the method is carried out in real time.

3. The method of claim 1, wherein the method is carried out during an on-going regeneration.

4. The method of claim 1, wherein the filter condition comprises accumulation and uniformity of particulate on the filter.

5. The method of claim 1, wherein the plurality of inputs relates to an availability of regeneration opportunities.

6. The method of claim 1, wherein the regeneration vector directs the regeneration to be carried out primarily by noxidation.

7. The method of claim 1, wherein the regeneration vector becomes more aggressive as the filter condition improves.

8. The method of claim 1, wherein the plurality of inputs relates to an availability of regeneration opportunities, and wherein the regeneration vector becomes more aggressive as the availability of regeneration opportunities worsens.

9. The method of claim 1, wherein the plurality of inputs relates to an availability of regeneration opportunities, and wherein the regeneration vector becomes more persistent as the availability of regeneration opportunities worsens.

10. The method of claim 1, wherein the regeneration vector comprises a filter particulate load parameter.

11. The method of claim 1, wherein the regeneration vector comprises a regeneration opportunity recognition parameter.

12. The method of claim 1, wherein the regeneration vector comprises an exhaust gas flow rate parameter.

13. The method of claim 1, wherein the regeneration vector comprises an exhaust gas composition parameter.

14. The method of claim 1, wherein the regeneration vector comprises a persistence parameter.

15. The method of claim 1, wherein the regeneration vector comprises a start-of-regeneration parameter, a type-of-regeneration parameter, and an end-of-regeneration parameter.

16. The method of claim 1, wherein the regeneration vector comprises a temperature parameter.

17. The method of claim 16, wherein the temperature parameter comprises a warm-up temperature parameter.

18. The method of claim 16, wherein the regeneration vector comprises a temperature ramp rate parameter.

19. The method of claim 16, wherein the temperature parameter comprises a maximum temperature parameter.

20. An internal combustion engine particulate filter regeneration apparatus capable of adapting its regeneration profile in real time, the apparatus comprising:
   a regeneration mechanism;
   a plurality of sensors configured to determine conditions of at least one of an engine and a filter, the conditions comprising the uniformity of particulates on the filter; and a controller comprising:
- an input module configured to receive a plurality of inputs based on the conditions determined by the sensors;
- a regeneration vector module configured to create a regeneration vector, the regeneration vector comprising a plurality of regeneration parameters based on the inputs; and
- an output module configured to direct the regeneration mechanism to regenerate the filter according to the regeneration vector.

21. The apparatus of claim 20, further comprising a conditions module configured to determine current conditions of the engine or filter, wherein the regeneration vector comprises a start-of-regeneration parameter, a type-of-regeneration parameter corresponding to one of a plurality of possible regeneration types, and an end-of-regeneration parameter, wherein the output module is configured to direct the regeneration mechanism to initiate filter regeneration when the start-of-regeneration parameter is satisfied by one or more current conditions, to end filter regeneration when the end-of-regeneration parameter is satisfied by one or more current conditions, and to alter the current conditions to the extent possible to correspond to the type-of-regeneration parameter.

22. The apparatus of claim 20, wherein the regeneration module, based on the inputs, is configured to create a regeneration vector ranging from passive to gentle to normal to aggressive.

23. The apparatus of claim 20, wherein the conditions comprise an availability of regeneration opportunities.

24. The apparatus of claim 20, wherein the conditions comprise a filter condition, and wherein the regeneration vector becomes more aggressive as the filter condition improves.

25. The apparatus of claim 20, wherein the conditions comprise an availability of regeneration opportunities, and wherein the regeneration vector becomes more aggressive as the availability of regeneration opportunities worsens.

26. A computer readable medium tangibly embodying a program of machine-readable instructions executable by a digital processing apparatus to perform operations to adapt a particulate filter regeneration profile, the particulate filter operatively connected to an engine, the operations comprising:
- receiving a plurality of inputs relating to a condition of the filter and an input comprising an availability of regeneration opportunities based on predicted manner in which the engine will be operated over time;
- creating a regeneration vector, the regeneration vector based on the inputs and comprising a plurality of regeneration parameters; and
- directing regeneration of the particulate filter according to the regeneration vector.

27. The computer readable medium of claim 26, wherein the regeneration vector comprises a start-of-regeneration parameter, a type-of-regeneration parameter, and an end-of-regeneration parameter, the operations further comprising determining current conditions of the engine or filter, directing a start to filter regeneration when the start-of-regeneration parameter is satisfied by one or more current conditions, directing an end to filter regeneration when the end-of-regeneration parameter is satisfied by one or more current conditions, and directing alteration of the current conditions to the extent possible to correspond to the type-of-regeneration parameter.

28. The computer readable medium of claim 26, wherein the inputs comprise filter condition and regeneration opportunity availability, wherein the regeneration vector is less aggressive when the filter condition is relatively poor, and wherein the regeneration vector is less aggressive when the regeneration opportunity availability is relatively good.

29. An exhaust aftertreatment system coupled to an internal combustion engine, the system comprising:
- an exhaust purification mechanism comprising a particulate filter;
- a regeneration mechanism operatively connected to and configured to regenerate the particulate filter;
- a plurality of sensors configured to determine conditions of the exhaust purification system and related components; and
- a controller comprising:
  - an input module configured to receive a plurality of inputs based on the conditions determined by the sensors and an input comprising an availability of regeneration opportunities based on a predicted manner in which the engine will be operated over time;
  - a regeneration vector module configured to create a regeneration vector, the regeneration vector comprising a plurality of regeneration parameters based on the inputs; and
  - an output module configured to direct the regeneration mechanism to regenerate the filter according to the regeneration vector.

30. The system of claim 29, further comprising a diesel engine, an engine intake mechanism operatively connected to the diesel engine, and an engine exhaust mechanism operatively connected to the diesel engine and the exhaust purification mechanism.

31. The system of claim 29, wherein the engine exhaust mechanism comprises a fuel injection mechanism, a turbocharger, and an exhaust gas recirculation mechanism, wherein the regeneration mechanism comprises a reactant dosing system, and wherein the controller is configured to control the fuel injection mechanism, the turbocharger, the exhaust gas recirculation mechanism, and the reactant dosing system to regenerate the filter according to the regeneration vector.

32. A method of adapting a regeneration profile of a particulate filter operatively connected to an engine, the method comprising:
- receiving an input relating to an accumulation and uniformity of particulate on the particulate filter;
- creating a regeneration vector based on the input, the regeneration vector comprising a plurality of regeneration parameters; and
- regenerating the particulate filter according to the regeneration vector.

33. The method of claim 32, wherein the plurality of regeneration parameters comprises a temperature parameter.

34. The method of claim 32, wherein the regeneration vector corresponds with one of a plurality of possible regeneration rates.

35. The method of claim 32, wherein the plurality of regeneration parameters comprises an exhaust gas flow rate parameter.

36. The method of claim 32, wherein the plurality of regeneration parameters comprises an exhaust gas composition parameter.

* * * * *